No. 865,743. PATENTED SEPT. 10, 1907.
W. T. WOOD.
TIRE.
APPLICATION FILED SEPT. 19, 1906.

William T. Wood, Inventor,

By E. G. Siggers

Witnesses
Howard D. Orr
B. G. Foster

Attorney

UNITED STATES PATENT OFFICE.

WILLIAM THOS. WOOD, OF NASHVILLE, TENNESSEE.

TIRE.

No. 865,743.  Specification of Letters Patent.  Patented Sept. 10, 1907.

Application filed September 19, 1906. Serial No. 335,326.

*To all whom it may concern:*

Be it known that I, WILLIAM THOS. WOOD, a citizen of the United States, residing at Nashville, in the county of Davidson and State of Tennessee, have invented a new and useful Tire, of which the following is a specification.

It is of course well known that with the ordinary tire, pressure brought against the outer wall causes the movement of said outer wall towards the inner wall, separating and doubling the side walls, and permitting their ready collapse.

One of the principal objects in the present invention is to provide a cushion tire, having novel means to support the same that will allow sufficient resiliency, and yet will effect a gradual increase in resistance to the inward movement of the outer tire wall, the farther said wall moves inwardly, the resisting power of the side walls moreover, being at all times maintained. Moreover, it is a well known fact that when the tread surface of a tire becomes cut, the sand and dirt forced into the cuts will often collect and work laterally along the outer surface of the fabric, finally forming protuberances or "warts" that will in time break out, and sometimes seriously injure the tire.

Another and important object is to provide a tire that will permit the free escape of matter that may collect in said cuts, thereby avoiding this very objectionable feature.

The preferred form of construction is illustrated in the accompanying drawings, wherein:—

Figure 1:
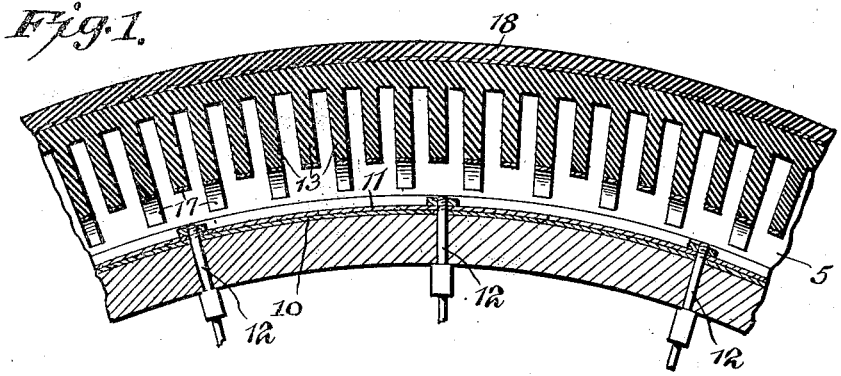
Figure 2:
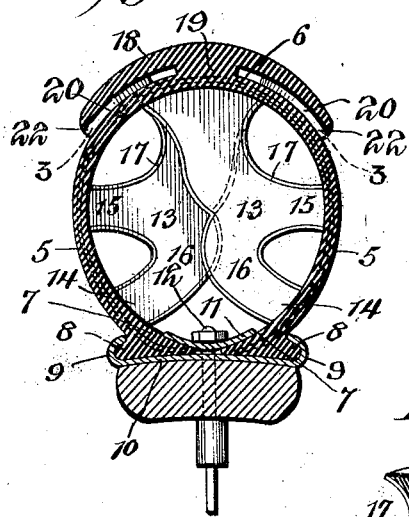
Figure 3:
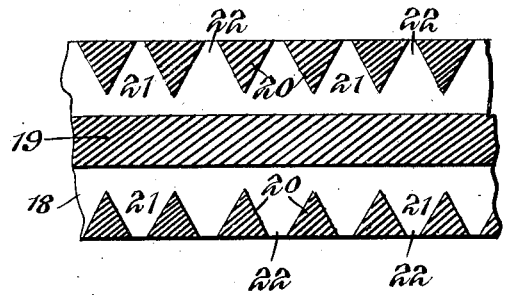
Figure 4:
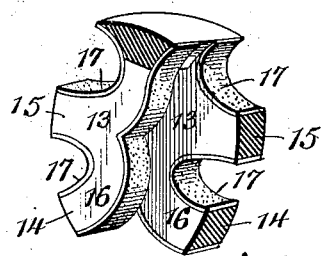

Figure 1 is a longitudinal sectional view through a portion of a tire, constructed in accordance with the present invention. Fig. 2 is a cross sectional view therethrough. Fig. 3 is a detail sectional view on the line 3—3 of Fig. 2, showing the under side of the tread element. Fig. 4 is a detail perspective view of a pair of the supporting posts.

Similar reference numerals designate corresponding parts in all the figures of the drawings.

In the embodiment illustrated, a casing is employed, comprising side walls 5, which in the present embodiment may be comparatively thin, an outer wall 6 reinforced by fabric in any well known manner, and an inner wall comprising sections 7, the said sections having outstanding ribs 8 arranged to interlock with the inwardly turned side flanges 9 of a rim 10. This interlocking engagement is maintained by a transversely curved holding strip 11 arranged within the casing, and having its angularly disposed margins bearing against the inner faces of the inner wall sections 7 to hold the sections separated and consequently maintain the ribs 8 interlocked with the flanges 9. The strip, which may be in sections, is held in place by suitable bolts 12.

Within the casing are arranged a plurality of independent yielding supporting posts 13, their outer ends being connected to the outer wall 6 preferably by vulcanization so that the parts are in effect integrally joined together. The inner ends of these posts are alternately connected to the opposite sides and inner portions of the casing, as shown at 14. Each post furthermore has an intermediate offset web 15, joined to one of the side walls, said webs being alternately connected to the opposite side walls, as will be evident by reference to Fig. 2. The portions of each post on opposite sides of its web 15 are bowed in the same direction, as shown at 16.

The operation of the supports may be briefly described as follows. When pressure is brought against the outer wall of the casing, the posts at first will be compressed, but as this pressure becomes greater, the said posts will bend, because of their bowed formation, on opposite sides of the webs. At the same time this bowing action will tend to force the webs inwardly, and thus prevent the outward collapse of the side walls. The result is a tire that is very efficiently supported, and yet is yielding so as to absorb the shocks and jars incident to its use. In order to avoid the cracking of the posts due to crystallization of the rubber or the like, the edges of said posts and webs that are free, are preferably covered with strips of fabric 17.

Extending over the outer side of the casing is a tread element 18. This tread element is provided with a central longitudinally disposed rib 19 and triangular projections 20 located on opposite sides of the rib, said projections being spaced from each other and from the rib. The rib and projections 20 are joined integrally to the outer wall of the casing, and as a result passages 21 are formed between the tread element and casing, said passages having contracted open mouths 22 located at the edges of the tread element. With this construction if the tread element is cut, the sand and dirt that is forced into such cut will pass into one of the passages and find a free passage through the outlet mouth 22 of such pocket. Moreover, inasmuch as the pressure upon the tire forces any such matter outwardly, it will be evident that the material will find a ready exit. As a result, it will be evident that a comparatively simple tire is provided, which is self-sustaining, is sufficiently yielding, is durable, and can be manufactured at comparatively small cost.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. A tire comprising a tubular casing, and a plurality of separate yielding supports located one behind the other within and connecting the inner and outer portions of the casing, said supports having separate lateral webs connected to the sides of the casing.

2. A tire comprising a tubular casing, and a plurality of independent yielding supports located one behind the other within and connecting the inner and outer portions of the casing, said supports having yielding webs that are alternately connected to the opposite sides of the casing.

3. A tire comprising a tubular casing, and a plurality of separate oppositely bowed laterally yielding supports located one behind the other within and connecting the inner and outer portions of the casing.

4. A tire comprising a tubular casing, and a plurality of separate laterally yielding independent spaced supports located within and connecting the inner and outer portions of the casing, said supports being alternately bowed in opposite directions.

5. A tire comprising a tubular casing, and a plurality of separate laterally yielding supports located within and connecting the inner and outer portions of the casing, certain of said supports being bowed in one direction, others in an opposite direction transversely of the tire, each support having an intermediate web connected to the side of the casing away from which it is bowed.

6. A tire comprising a tubular casing, and a plurality of oppositely bowed laterally yielding supports located within and connecting the inner and outer portions of the casing, said supports having independent intermediate webs that are alternately connected to the opposite sides of the casing.

7. A tire comprising a tubular casing, and a plurality of spaced independent yielding supporting posts located within and connecting the inner and outer portions of the casing, said posts each having an offset web connected to one of the sides of the casing, said webs being alternately connected to the opposite sides, and the posts each having the portions on the opposite sides of the web bowed in the same direction.

8. A tire comprising a casing, and a tread element extending over the outer portion of the casing and having portions free from said casing, forming a dirt-receiving passage between the casing and tread elements, said passage having an open mouth.

9. A tire comprising a casing, and a tread element extending over the outer portion of the casing, said tread element having portions secured to the casing, and portions free therefrom forming a dirt-receiving passage, the said passage tapering to one side and having a restricted open mouth at one edge of the tread element.

10. A tire comprising a casing, and a tread element extending over the outer portion of the casing, said tread element having portions secured to the casing, and spaced portions free therefrom, forming inclosed passages, said passages having open mouths at the edges of the tread element.

11. A tire comprising a casing, and a tread element extending over the outer portion of the casing and having an intermediate longitudinal portion, and spaced portions on opposite sides of the intermediate portion secured to said casing, other portions being free, and forming passages having open mouths.

12. A tire comprising a casing, and a tread element that extends over the outer side of the casing, a longitudinal rib connecting the intermediate portion of the tread element, and the casing, and a plurality of spaced substantially triangular portions connecting the margins of the tread to the casing on opposite sides of the rib, thereby forming passages between the tread element and casing, said passages having outer open mouths along the edges of the tread.

13. A tire comprising a tubular casing, a plurality of yielding supports located within and connecting the inner and outer portions of the casing, said supports having lateral webs connected to the sides of the casing, and fabric covering the sides of the support that are free from said casing.

14. A tire comprising a tubular casing, a plurality of oppositely bowed laterally yielding supports located within and having their ends secured to the inner and outer portions of the casing, and fabric covering the opposite sides of the supports between the secured ends.

15. The combination with a rim having seats, of a tire comprising a tubular casing having an inner sectional wall, the sections of such wall having outstanding ribs that interlock in the seats of the rim, separate supports engaging the outer tire wall and respectively secured to the sections of the inner wall, said supports permitting the spreading of said sections, a holding strip located between the sections of the inner wall, and fastener means engaging the strip.

16. The combination with a rim having seats, of a tire comprising a tubular casing having an inner sectional wall, the sections of said wall having outstanding ribs that engage in the seats of the rim, separate supports secured to the outer tire wall, certain of the supports being secured to one of the sections of the inner wall and bowed toward the other section, others in like manner being secured to said other section and bowed toward the first mentioned section, and means bearing against the said sections of the inner wall for maintaining them separated.

In testimony, that I claim the foregoing as my own, I have hereto affixed my signature in the presence of two witnesses.

WILLIAM THOS. WOOD.

Witnesses:
J. S. WARD,
J. H. ULLRICK.